Figure 1:
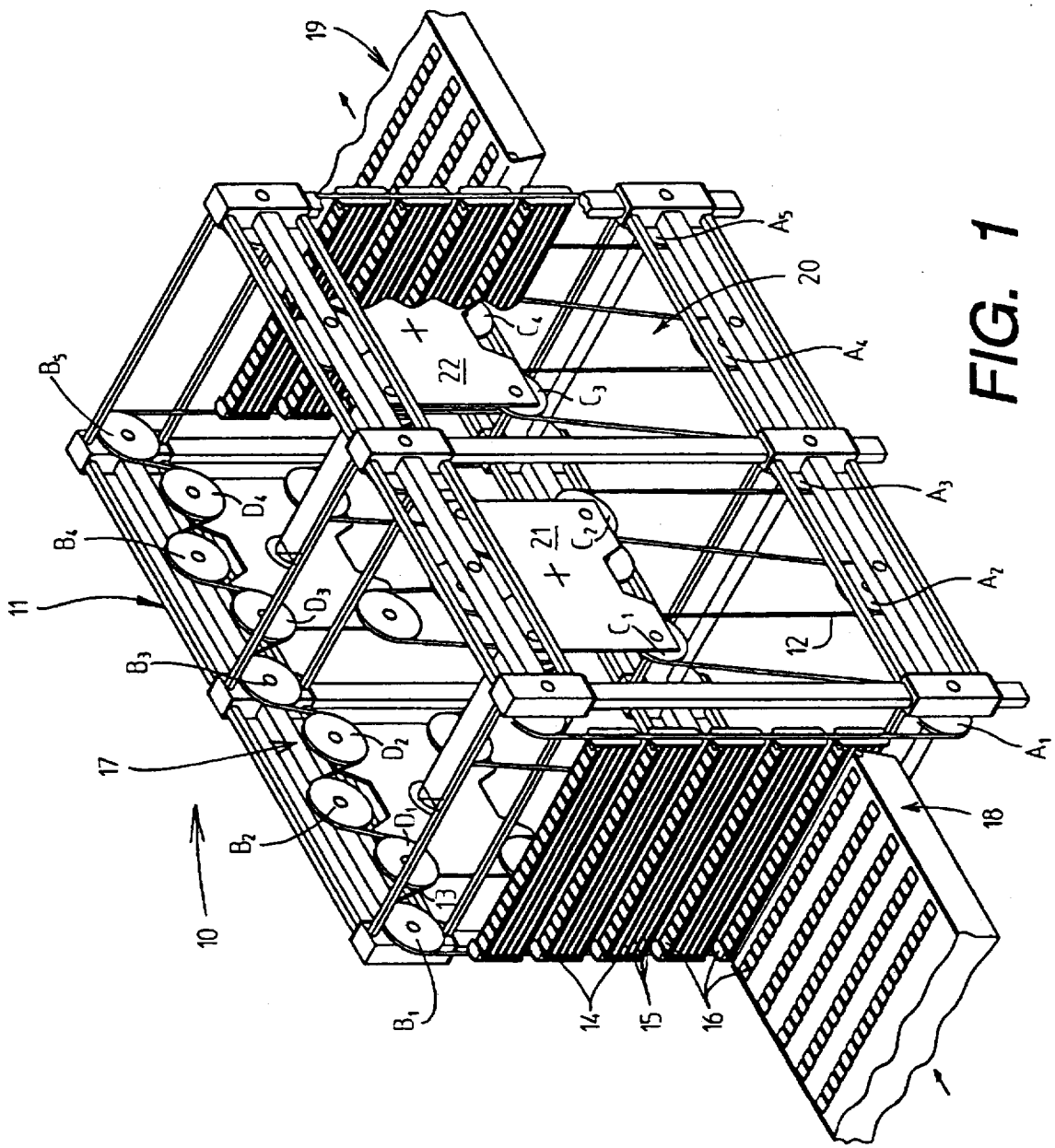

United States Patent [19]

Walser et al.

[11] Patent Number: 5,713,455
[45] Date of Patent: Feb. 3, 1998

[54] SUSPENDED STORAGE APPARATUS

[75] Inventors: Hans Heiri Walser, Grüsch; Hans Peter Aliesch, Lucerne; Armin Hofmann, Bussigny, all of Switzerland

[73] Assignee: Sapal Societe Anonyme des Plieuses Automatiques, Ecublens, Switzerland

[21] Appl. No.: 571,912

[22] PCT Filed: May 2, 1995

[86] PCT No.: PCT/CH95/00097

§ 371 Date: Feb. 9, 1996

§ 102(e) Date: Feb. 9, 1996

[87] PCT Pub. No.: WO95/29862

PCT Pub. Date: Nov. 9, 1995

[30] Foreign Application Priority Data

May 3, 1994 [FR] France ................... 94 05777

[51] Int. Cl.⁶ .................................. B65G 37/00
[52] U.S. Cl. ................... 198/465.1; 198/803.01
[58] Field of Search ................ 198/465.1, 465.4, 198/687.1, 803.01

[56] References Cited

U.S. PATENT DOCUMENTS 5,253,745  10/1993  van den Bergh ............ 198/803.01

FOREIGN PATENT DOCUMENTS 626027   12/1962  Belgium .
0538742  10/1992  European Pat. Off. .
7810791  10/1978  Netherlands .
719696   12/1954  United Kingdom .

Primary Examiner—Joseph E. Valenza
Attorney, Agent, or Firm—Davis and Bujold

[57] ABSTRACT

An apparatus for the suspended storage of foodstuffs, particularly slabs of chocolate or the like, arranged on shelves (15) lying flat on trays (14) capable of accommodating a number of such shelves. The shelves (15) are releasable and arranged parallel to one another at a constant spacing, and each shelf forms a plate receiving at least one row of similar foodstuffs. The shelves comprise a closed profile member (80) and two end portions (82) that can be fitted onto the longitudinal ends of the member and are therefore reversible so that they can be reinserted in any position into the trays without using an indexing system.

12 Claims, 4 Drawing Sheets

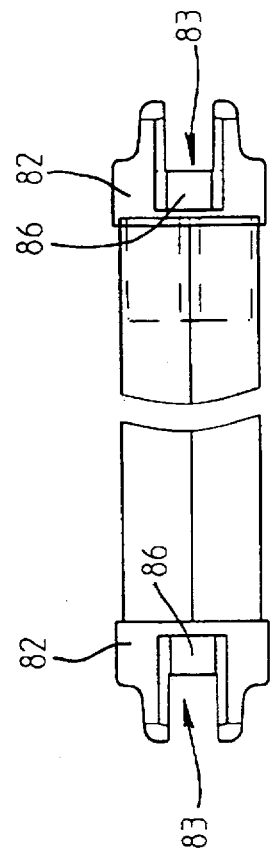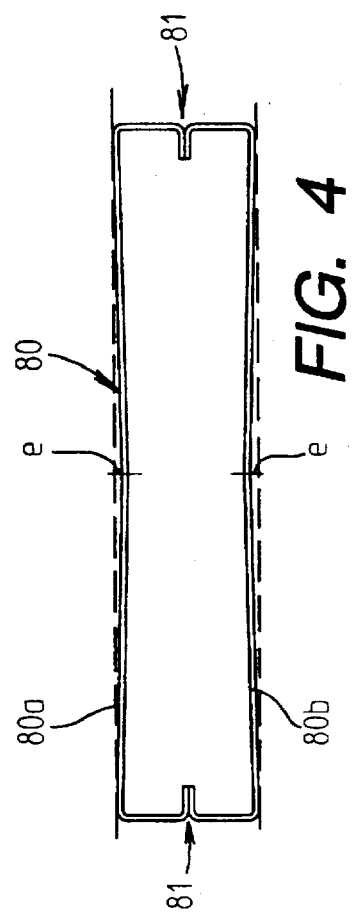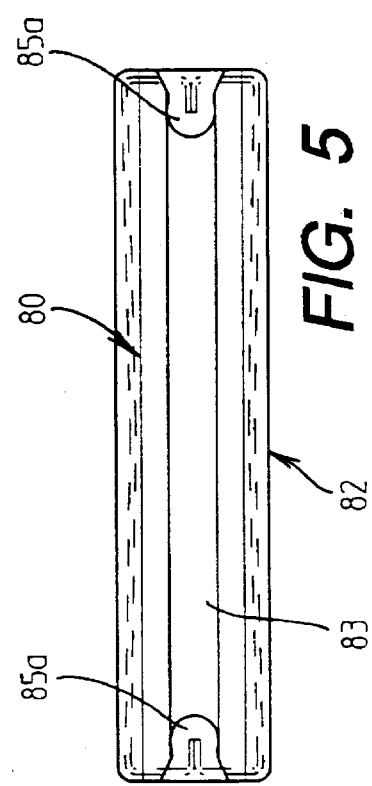

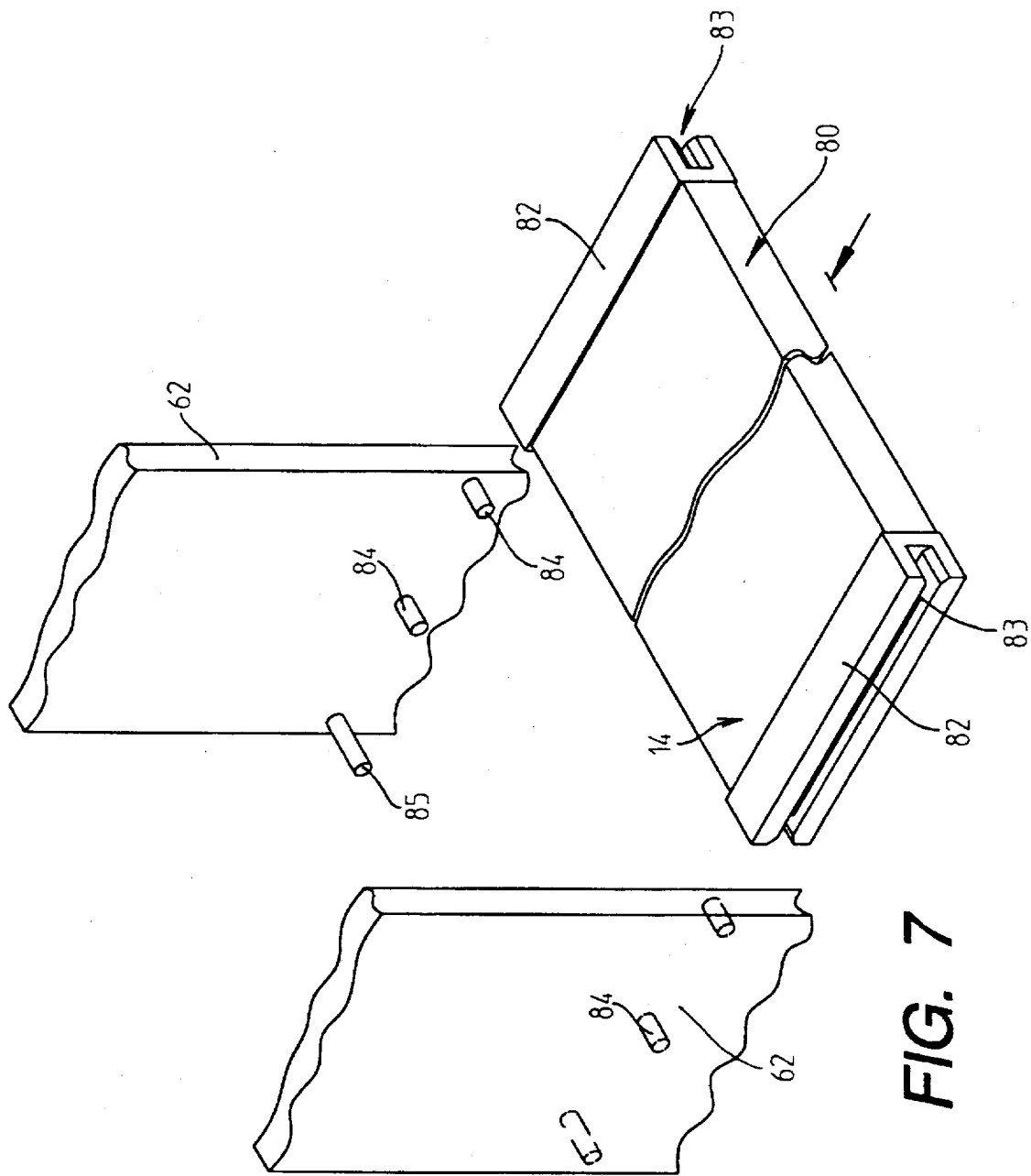

SUSPENDED STORAGE APPARATUS

The present invention concerns a pendulant storage installation for temporarily storing products, in particular food products, and more particularly for bars of chocolate or the like, these products being placed on shelves arranged horizontally on pendulant product carriers horizontally suspended on two chains mounted on a frame and moving parallel to each other in a closed circuit, this installation comprising a feed section going from a station for loading the products on the shelves, to a product receiving station arranged for unloading the shelves, and a return section in which the shelves are brought back empty from the receiving station to the loading station, in which the pendulant product carriers are provided with means for receiving several removable horizontal shelves arranged parallel to each other as a constant spacing, these shelves each constituting a tray arranged for receiving at least one row of similar products.

Numerous pendulant storage installations are already known, in particular that disclosed in the European Patent application published under number 0 538 742 A1. In food product production lines, for example of bars of chocolate, biscuits, chocolate covered products and other products which are fragile and delicate to handle, it is often necessary to be able to have a temporary storage installation available for these products, given that production is carried out continuously while packaging is carried out in batches and the packaging units of a same line are periodically subject to halts required for maintenance, repair or the placing of packing material.

These storage installations must comply with relatively burdensome specifications. They must allow large storage capacity and assure efficient and careful transport of the products from a loading station no a receiving station, while providing maximum security for the conveyed products, great flexibility of use and variable storage potential as a function of the instant demand.

One of the problems presented by these installations is that of maintenance and regular cleaning of the shelves, in order to satisfy standards of hygiene, in particular when the products to be stored are food products and are capable of dirtying the shelves. In existing installations, this cleaning can only be carried out when the installation is stopped, which imposes significant interruption time on the user and therefore constitutes a particularly inconvenient disadvantage which has a negative effect on the productivity of the installation.

In pendulant storage installations such as that disclosed in British Patent No. 719 696, the shelves, while able to be removed, are not generally reversible or they comprise rims which make storage, cleaning or automatic replacing after cleaning difficult.

Furthermore, the shape and design of these shelves does not generally lend itself to simple and efficient cleaning. Multiple rims constitute as many nooks for accumulating and developing bacteria which require complex and costly cleaning and asepticising methods.

Finally, the asymmetrical shape of the trays creates problems when they are replaced after cleaning, in particular if this replacement is carried out automatically, because it requires indexing the trays or means for marking their position.

The present invention proposes to overcome the aforementioned disadvantages by providing a storage installation of the type defined in the preamble and which enables the trays to be regularly replaced without stopping, or even disturbing the operation of the installation, the shelves being designed to be able to undergo rapid and efficient cleaning, and to guarantee as best as possible the standards of hygiene required when the products to be processed are food products.

These objects are achieved by the storage installation according to the invention, which is characterised in that the removable shelves comprise a closed profile and two end fitting pieces arranged for fitting onto this closed profile, at its longitudinal ends.

In a preferred embodiment, said end fitting pieces comprise means for assuring the fixing of the shelves on the pendulant product carriers.

Preferably, these means comprise a central groove arranged in said end fitting pieces and nipples which are attached to the lateral supports of the pendulant product carriers and arranged for engaging in said central groove, one of said nipples being longer than the other.

In an advantageous manner, said long nipple having a greater length than the other short nipple, is arranged for cooperating with a shoulder of said end fitting piece to define an end of travel stop position of the shelf in relation to the pendulant product carrier.

In this embodiment, said end fitting pieces comprise at least one recess arranged for receiving said long nipple, this recess having an opening whose cross-section is slightly smaller than that of the nipple, the walls of this opening having sufficient elasticity to enable the nipple to snap fit into the recess.

In an advantageous manner, the shelves have a symmetrical shape, each end fitting piece comprising two recesses arranged at the ends of the central groove and arranged for receiving a long nipple.

Preferably, the thickness of the end fitting pieces is greater than the thickness of the closed profile and the end fitting pieces assure a sealing of the closed profile at its longitudinal ends.

In the preferred embodiment, said closed profile is realised by a rigid connection of two U-shaped profiles, these profiles being joined along their edges so as to form a hollow profile.

This connection may be achieved by laser welding.

In an advantageous manner, the two faces of the shelf have a dip along a central line parallel to their edges.

Figure 2:
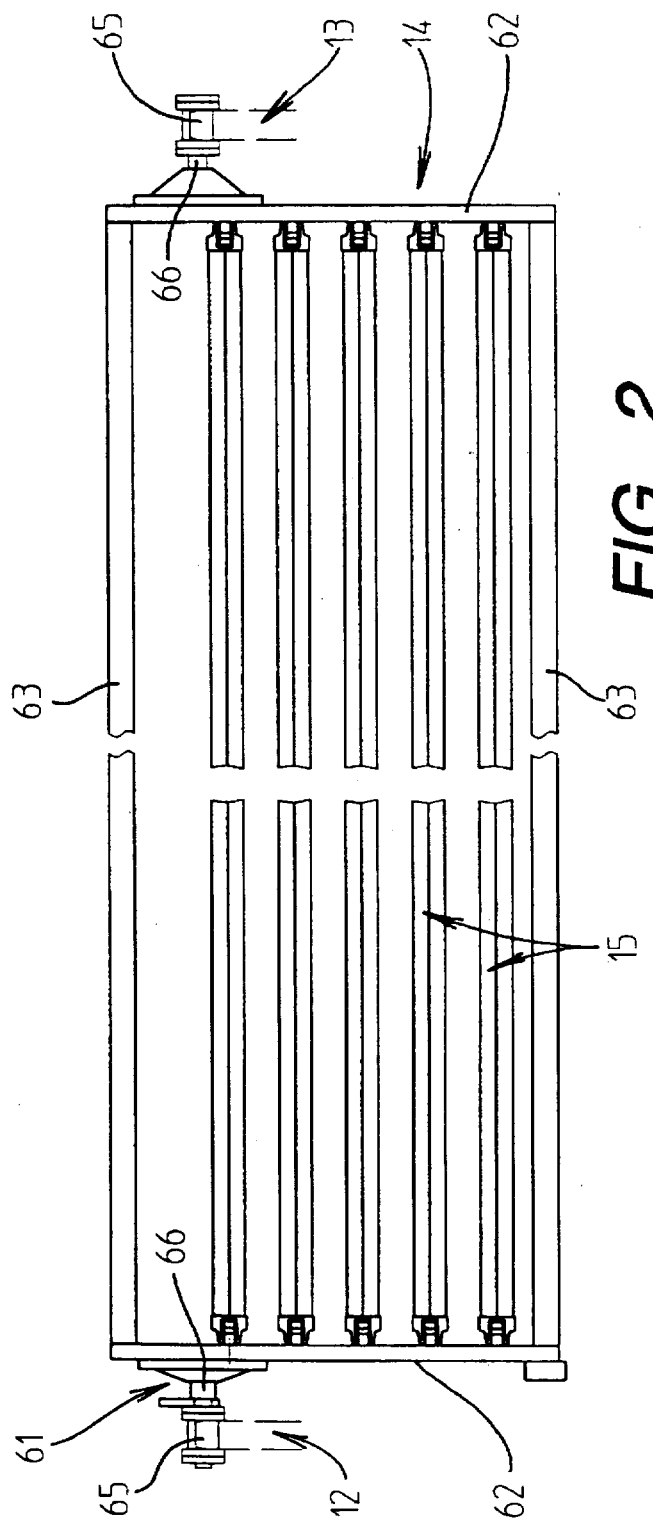

The present invention will be better understood with reference to the description of preferred embodiments given by way of non limiting example and to the attached drawings in which:

FIG. 1 shows a schematic perspective view of an installation according to the invention, FIG. 2 shows a schematic elevation view of a pendulant product carrier of an installation according to the invention, and FIGS. 3, 4, 5, 6 and 7 show different views illustrating an embodiment of the shelves carried by the pendulant product carriers.

Referring to FIG. 1, the pendulant storage installation 10, shown in perspective, consists principally of a frame 11 which, in this case, has the shape of a parallelepipedic rectangle which defines a storage space inside which are mounted two endless conveying chains 12 and 13 between which pendulant product carriers 14 are suspended carrying shelves 15 on which products 16 are placed. Pendulant product carriers 14 are suspended horizontally by two lateral pivots on chains 12 and 13 which move parallel to each other along a multiple loop path comprising a first section called the feed section 17 going from a station 18 for loading the products onto the shelves to a receiving station 19, arranged for unloading said shelves, and a second section 20 called the return section in which the previously unloaded shelves return from the receiving station to the loading station. In the example shown, the installation comprises five pairs of lower sprocket wheels, A1, A2, A3, A4, A5 respectively, and five pairs of upper sprocket wheels, B1, B2, B3, B4, B5 respectively, which are mounted on fixed shafts carried by the frame. Furthermore, the installation comprises, in the example shown, two vertically mobile carriages 21 and 22 respectively, which each carry two pairs of lower sprocket wheels C1, C2 (for carriage 21) and C3, C4 (for carriage 22) and two pairs of upper sprocket wheels D1, D2 (for carriage 21) and D3, D4 (for carriage 22). The feed section of the closed circuit defined by the two chains 12 and 13 consists of chain segments passing from the loading station immediately below sprocket wheels B1, then above these sprocket wheels, below upper sprocket wheels D1 of carriage 21, above sprocket wheels B2, below upper sprocket wheels D2 of carriage 21, then above sprocket wheels B3, below upper sprocket wheels D3 of carriage 22, above sprocket wheels B4, below upper sprocket wheels D4 of carriage 22, and above sprocket wheels B5 in order to descend again vertically to the receiving station. The return section is defined by the sections of chain going from the return station below sprocket wheels A5, then above lower sprocket wheels C4 of carriage 22, below sprocket wheels A4, above lower sprocket wheels C3 of carriage 22, below sprocket wheels A3, above lower sprocket wheels C2 of carriage 21, below sprocket wheels A2, above lower sprocket wheels C1 of carriage 21, and finally below sprocket wheels A1 to return straight down to the loading station. As a result of the mobile carriages, the storage installation has a variable accumulation or storage capacity. When the carriages are in a high position, the feed section is minimal, that is to say that the products are conveyed as quickly as possible from the loading station to the receiving station. On the other hand, when the carriages descend to a low position, the length of the feed section increases as does the installation storage capacity.

FIG. 2 shows an elevation view of one of pendulant product carriers 14 carrying shelves 15.

Each pendulant product carrier 14 consists of a frame formed of two lateral supports 62 connected by two side members 63 mounted parallel to the respective ends of supports 62. These supports 62 comprise means enabling shelves 15 to be fixed, said shelves being preferably mounted in a removable manner on the pendulant product carriers and arranged parallel to each other. Pendulant product carrier 14 is suspended by its lateral supports 62 on links 65 of two chains 12 and 13. Supports 62, and consequently pendulant product carrier 14, are suspended on two horizontal pivots 66 which in fact constitute a prolongation of the pin of links 65. Dampening device 61 is preferably mounted on one side of pendulant product carrier 14. However, a device of this type could be fitted to both sides to obtain a more significant dampening effect on the swinging movement of the pendulant product carrier.

Figure 3:
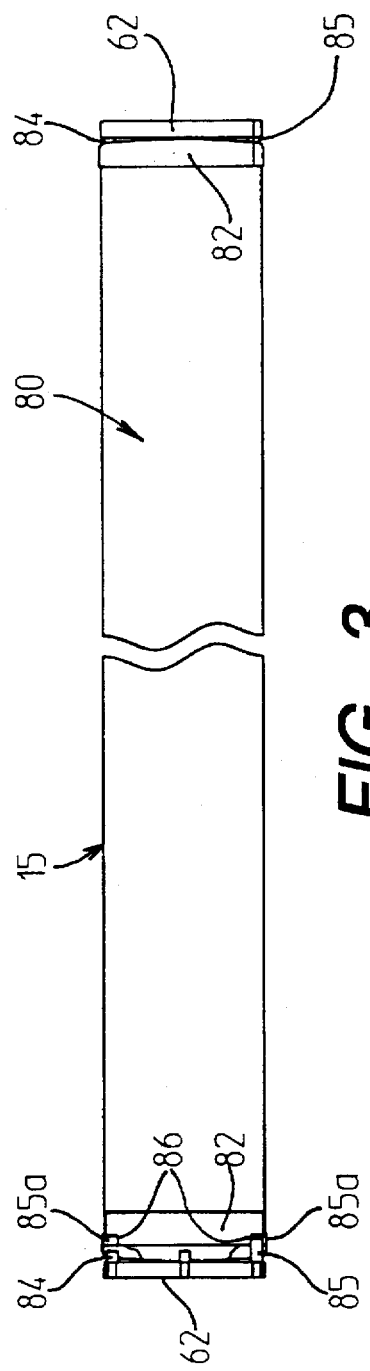

FIGS. 3 to 7 show different views of shelves 15. FIG. 3 shows this shelf, seen from above, in position on a pendulant product carrier. The shelf itself consists of (see FIG. 4) of a closed profile 80, preferably in stainless steel, which is formed from two open U-shaped profiles 80a and 80b, which are assembled along their juxtaposed edges 81. This assembly can be made by bonding or, preferably, by welding. A laser welding technique has proved particularly efficient and guarantees perfect sealing and incomparable finish quality. This welding technique is carried out with a low energy input which does not induce stresses capable of modifying the dimensions or shape of the shelves. As a result of this technique, a high level of dimensional integrity of the shelves is obtained. The sealing is essential to be able to comply with the hygiene standards prescribed for use with food products. The two open profiles 80a and 80b are designed so as to have a small dip e in their centre respective to their longitudinal edges. This design is particularly advantageous in connection with certain products with a flat base, such as, in particular, bars of chocolate or similar products, for assuring a better stability of the product on the shelves, these products produced by moulding not always having a perfectly flat base surface, for avoiding frictional contact of the products over the whole surface of the shelf and consequently limiting the dirtiness of said shelf.

Closed profile 80 is fitted at both of its longitudinal ends with two end fitting pieces 82 (see FIGS. 3, 5, 6 and 7) which are designed to fit onto its ends and to assure the removable fixing of the shelves on the pendulant product carriers. These end fitting pieces are made of synthetic material, obtained by moulding and assure a sealing of profile 80 at its ends. End fitting pieces 82 are provided with a central groove 83 arranged for cooperating with nipples 84 and 85 which are attached to lateral supports 62 of pendulant product carriers 14, assuring that the shelves are held in position. It will be noted that nipples 84 are shorter than nipples 85, the latter being intended to abut against a shoulder 86 which constitutes an end of travel stop. Furthermore, end fitting pieces 83 are provided, in the zone delimited by said shoulder, with a recess 85a for receiving said nipple 85. This recess 85a has an opening whose cross-section is slightly smaller than that of nipple 85. The introduction of this nipple is achieved as a result of the elasticity of the material in which the end fitting pieces and more particularly, the recess opening are made. This material is advantageously a synthetic material which can be thermoformed The positioning of the shelf is carried out by sliding it at low friction until nipples 85 reach the opening of recesses 85a. The introduction of the nipples into these recesses requires a snapping force to be applied which enables these nipples to pass the hard points formed by said reduced cross-section openings. When nipples 85 are engaged in the recesses, the shelf is blocked in position, this position being perfectly defined by the abutment of said nipples 85 on shoulders 86.

It will be noted that a second short nipple 84 may be provided on lateral supports 62 to facilitate the positioning of the shelves, by assuring better guiding of these shelves (see FIG. 7).

The perfect symmetry of the shelves will also be noted, this symmetry enabling the user to be released from having to arrange the orientation of said shelves. Either of the two supporting faces may be used for receiving products. Since grooves 83 are symmetrical, there is no defined direction for introducing the shelves into the pendulant product carriers.

Finally, it will be noted that the thickness of end fitting pieces 82 is slightly greater than that of profile 80, which enables the shelves to be stacked by superposing the end fitting pieces without the profiles forming the useful part of the shelf touching each other.

Withdrawal of the shelves is carried out in reverse, that is to say that an initial force must be applied against the snap mechanism, then said shelves are withdrawn virtually effortlessly.

This positioning and withdrawal may be carried out either manually or mechanically. An automatic shelf removal and introduction device may be used in the frame of this installation due to the fact that these shelves are perfectly symmetrical and therefore reversible. Whatever the orientation of these shelves in the removal and introduction device, or in any storage zone, they can be reintroduced into the pendulant product carriers without requiring indexing systems or position sensors or the like.

We claim:

1. Pendulant storage device for temporarily storing products, in particular food products and more particularly bars of chocolate or the like, these products being placed on shelves arranged horizontally on pendulant product carriers horizontally suspended on two chains moving parallel to each other in a closed circuit, this installation comprising a feed section going from a station for loading products on the shelves, to a product receiving station, arranged for unloading the shelves, and a return section in which the empty shelves are brought back from the receiving station to the loading station, in which the pendulant product carriers (14) are provided with means for receiving several removable horizontal shelves (15) arranged parallel to each other at a constant spacing, each of these shelves constituting a tray arranged for receiving at least one row of similar products, characterised in that the removable shelves comprise a closed profile (80) and two end fitting pieces (82) arranged for fitting onto this closed profile, at its longitudinal ends.

2. Installation according to claim 1, characterised in that said end fitting pieces (82) comprise means for assuring the fixing of the shelves on the pendulant product carriers.

3. Installation according to claim 2, characterised in that said means comprise a central groove (83) arranged in said end fitting pieces (82) and nipples (84, 85) which are attached to lateral supports (62) of the pendulant product carriers (14) and which are arranged for engaging in said central groove.

4. Installation according to claim 3, characterised in that one (85) of said nipples is longer than the other (84).

5. Installation according to claim 4, characterised in that said long nipple (85) having a greater length than that of the other short nipple (84) is arranged for cooperating with a shoulder (86) of said end fitting piece to define an end of travel stop position of the shelf in relation to the pendulant product carrier.

6. Installation according to claim 5, characterised in that said end fitting pieces (82) comprise at least one recess arranged for receiving said long nipple (85), this recess having an opening whose cross-section is slightly smaller than that of said nipple, the walls of this opening having sufficient elasticity to enable the nipple to snap fit into the recess.

7. Installation according to claim 5, characterised in that the shelves have a symmetrical shape, each end fitting piece comprising two recesses arranged at the ends of the central groove and arranged for receiving a long nipple (85).

8. Installation according to claim 1, characterised in that the thickness of the end fitting pieces (82) is greater than the thickness of the closed profile (80).

9. Installation according to claim 1, characterised in that the end fitting pieces assure a sealing of the closed profile (80) at its longitudinal ends.

10. Installation according to claim 1, characterised in that said closed profile (80) is formed by a rigid connection of two U-shaped profiles (80a and 80b), these profiles being joined along their edges so as to form a hollow profile.

11. Installation according to claim 10, characterised in that said connection is achieved by laser welding.

12. Installation according to claim 10, characterised in that the two faces of the shelf (15) have a dip along a central line parallel to their edges.

* * * * *